United States Patent Office 3,069,471
Patented Dec. 18, 1962

3,069,471
PREPARATION OF WATER-SOLUBLE SULFONES
Irving Tashlick, Colonial Village, Mass., assignor to Monsanto Chemical Company, St. Louis, Mo., a corporation of Delaware
No Drawing. Filed Nov. 20, 1961, Ser. No. 153,696
7 Claims. (Cl. 260—607)

This invention relates to the preparation of water-soluble sulfones. More particularly, the invention relates to a process for preparing water-soluble sulfones in high yield from the corresponding sulfoxides.

Various oxidation processes are known to be effective in preparing water-soluble sulfones, e.g., bis(beta-hydroxyethyl)sulfone, from the corresponding sulfides. However, because of one or more of the disadvantages of relatively low conversion to sulfone, relatively high conversion to contaminating by-products, and the presence of an organic solvent, none of these known processes provides an efficient method of preparing the sulfones in high yield for use in organic solvent-free systems.

One object of this invention is to provide a novel process for preparing water-soluble sulfones.

Another object is to provide a process for preparing water-soluble sulfones in high yield in the absence of organic solvents.

These and other objects are attained by reacting a water-soluble sulfoxide with a substantially stoichiometric, i.e., equimolar, amount of hydrogen peroxide in an aqueous system at a temperature of at least 90° C. and preferably at temperatures in the range of 90–120° C.

The following examples are given to illustrate the invention. Parts and percentages mentioned are parts and percentages by weight.

EXAMPLE I

Preparation of Sulfoxide

A suitable reaction vessel is charged with 500 parts of bis(beta-hydroxyethyl)sulfide, followed by the gradual addition of 400 parts of a 35% aqueous hydrogen peroxide solution (about 1.006 mols of hydrogen peroxide per mol of the sulfide) at a constant rate over a 90-minute period. The temperature of the reaction is maintained at 50–80° C. by means of an ice bath surrounding the reaction vessel. The reaction results in substantially quantitative conversion of the sulfide to bis(beta-hydroxyethyl)sulfoxide.

EXAMPLE II

Preparation of Sulfone

The 900 parts of aqueous bis(beta-hydroxyethyl)sulfoxide solution prepared in Example I are charged to a suitable reaction vessel and heated to reflux temperature. The temperature is maintained at reflux (102–105° C.) during the subsequent addition of 395 parts of a 35% aqueous hydrogen peroxide solution (about 0.99 mol of hydrogen peroxide per mole of the sulfoxide) over a 175-minute period at a constant rate such that the concentration of hydrogen peroxide is maintained below 5% of the total reaction mixture. After completion of the addition of peroxide solution, the reaction mixture is maintained at reflux temperature for 30–60 minutes until the peroxide concentration is less than 0.01% of the total reaction mixture.

The product of the reaction is a 48% aqueous bis(beta-hydroxyethyl)sulfone solution containing a small amount of acidic by-products. Pure bis(beta-hydroxyethyl)sulfone is isolated in crystalline form by precipitating the acidic impurities by the addition of a stoichiometric amount of calcium carbonate, filtering to remove the precipitate, and evaporating water.

The invention is a process for preparing water-soluble sulfones from reaction mixtures consisting of water and substantially equimolar amounts of the corresponding sulfoxide and hydrogen peroxide at a temperature of at least 90° C. and preferably at temperatures in the range of 90–120° C.

Sulfoxides utilizable in the practice of this invention are the water-soluble sulfoxides in which both organic radicals attached to the sulfinyl group are free of elements and groups more susceptible to oxidation than the sulfinyl group, especially the water-soluble sulfoxides corresponding to the general formula:

wherein R and R' are independently selected from the group consisting of alkyl radicals containing 1–6 carbon atoms, hydroxyalkyl radicals containing 2–6 carbon atoms and having the hydroxyl group attached to a carbon atom at least as far removed from the sulfinyl group as the beta-carbon atom, alkenyl radicals containing 2–6 carbon atoms, phenyl, etc. Examples of such sulfoxides are bis(beta-hydroxyethyl)sulfoxide, bis(beta-hydroxypropyl)sulfoxide, divinylsulfoxide, phenylethylsulfoxide, beta-hydroxyethylmethylsulfoxide, etc. These sulfoxides can be prepared by oxidation of the corresponding sulfides, using any suitable technique, e.g., treating the sulfide with oxygen, nitric acid, sodium hypochlorite, or hydrogen peroxide at temperatures maintained in the range of about 50–80° C., and are advantageously prepared by reacting the sulfides with a substantially equimolar amount of hydrogen peroxide in an aqueous system, as shown in Example I, to minimize contamination of the sulfoxides with undesirable impurities. In the practice of the invention, the sulfoxides can be liquefied by heating and then reacted with an aqueous solution of hydrogen peroxide, when the hydrogen peroxide solution employed contains sufficient water to satisfy at least the minimum water requirements of the process. However, for convenience of operation, the sulfoxides are usually employed as aqueous solutions.

The hydrogen peroxide which is reacted with the sulfoxides is employed as an aqueous solution, usually an aqueous solution containing about 10–50% by weight of hydrogen peroxide, although more dilute or more concentrated solutions can be used if desired. The amount of peroxide solution employed should be such that the molar ratio of hydrogen peroxide to sulfoxide in the reaction mixture is in the range of 0.98:1 to 1.02:1, and the concentration of the peroxide solution should be such as to permit compliance with the minimum water requirements of the process.

Throughout the reaction, the reaction mixture should contain at least about 15% by weight of water, based on the total weight of the mixture, to avoid explosive decomposition of the hydrogen peroxide, and ordinarily contains about 20–70% by weight of water. The process of the invention is effective when the reaction mixture contains even higher concentrations of water, but the efficiency of the process is decreased at such high dilutions. The amount of water in the reaction mixture can be varied by the obvious expedient of varying the concentration of either the sulfoxide solution or the hydrogen peroxide solution or both.

The process of the invention is preferably accomplished by heating the aqueous solution of sulfoxide to a temperature in the range of 90–120° C., maintaining the temperature at 90–120° C. while adding the aqueous solution of hydrogen peroxide at a constant rate such that the concentration of hydrogen peroxide in the reaction mixture is maintained below about 20% by weight, based on the total weight of the mixture, and maintaining the reaction mixture at 90–120° C. until conversion of the sulfoxide to the corresponding sulfone is substantially complete. Temperatures in excess of 120° C. can be used, but are not preferred as they necessitate the use of pressure resistant reactors. According to a preferred embodiment of the invention, the peroxide solution is added at a rate such that the concentration of peroxide in the reaction mixture is maintained below about 5% by weight. This embodiment of the invention prevents the accumulation of possibly dangerously high concentrations of peroxides in the reaction mixture.

The process is conducted most efficiently at reflux temperatures, since the rate of reaction is slower at lower temperatures and the process must be conducted under pressure at higher temperatures. This temperature may be attained by the application of external heat when the heat of reaction is insufficient to maintain the reaction temperature within this temperature range.

The process of the invention results in the formation of an aqueous solution of water-soluble sulfone containing a small amount of acidic by-products. It is usually desirable to neutralize these acidic impurities by the addition of a stoichiometric amount of a neutralizing agent, such as calcium carbonate. When the pure water-soluble sulfone is desired, it can be isolated in crystalline form by adding a stoichiometric amount of a suitable neutralizing agent, e.g., an alkaline earth metal base, to precipitate the acidic impurities, removing the precipitate by filtration, and then removing the water, e.g., by evaporation.

The process of the invention is particularly advantageous in that it permits the formation of water-soluble sulfones in high yield without the use of catalysts or organic solvents which increase the degree of contamination of the product.

It is obvious that many variations may be made in the processes set forth above without departing from the spirit and scope of this invention.

This application is a continuation in part of copending application Serial No. 854,017, filed November 19, 1959.

What is claimed is:

1. A process which consists of heating to at least 90° C. an initial charge consisting of an aqueous solution of a water-soluble sulfoxide in which the organic radicals attached to the sulfinyl group are free of elements and groups more susceptible to oxidation than the sulfinyl group, maintaining the temperature at at least 90° C. while gradually adding to the initial charge a second charge consisting of an aqueous solution of a substantially stoichiometric amount of hydrogen peroxide at a constant rate such that the concentration of hydrogen peroxide in the reaction mixture is maintained below about 20% by weight of the mixture, and maintaining the reaction mixture at at least 90° C. until conversion of the sulfoxide to the corresponding sulfone is substantially complete, the concentration of water in the reaction mixture being maintained above about 15% by weight of the mixture throughout the reaction.

2. A process as in claim 1 wherein the water-soluble sulfoxide is bis(beta-hydroxyethyl)sulfoxide.

3. A process as in claim 1 wherein the reaction temperature is reflux temperature.

4. A process as in claim 1 wherein the rate of addition of peroxide solution to sulfoxide solution is such that the concentration of hydrogen peroxide in the reaction mixture is maintained below about 5% by weight.

5. A process which consists of heating to 90–120° C. an initial charge consisting of an aqueous solution of a water-soluble sulfoxide in which the organic radicals attached to the sulfinyl group are free of elements and groups more susceptible to oxidation than the sulfinyl group, maintaining the temperature at 90–120° C. while gradually adding to the initial charge a second charge consisting of an aqueous solution of a substantially stoichiometric amount of hydrogen peroxide at a constant rate such that the concentration of hydrogen peroxide in the reaction mixture is maintained below about 20% by weight of the mixture, and maintaining the reaction mixture at 90–120° C. until conversion of the sulfoxide to the corresponding sulfone is substantially complete, the concentration of water in the reaction mixture being maintained above about 15% by weight of the mixture throughout the reaction.

6. A process which comprises adding 395 parts by weight of an aqueous solution containing about 35% by weight of hydrogen peroxide to 900 parts by weight of an aqueous solution containing about 63% by weight of bis(beta-hydroxyethyl)sulfoxide at reflux temperature at a constant rate such that the concentration of hydrogen peroxide in the reaction mixture is maintained below about 5% by weight of the mixture, and maintaining the reaction mixture at reflux temperature until conversion of bis(beta-hydroxyethyl)sulfoxide to bis(beta-hydroxyethyl)sulfone is substantially complete.

7. A process as in claim 6 wherein the aqueous solution of sulfoxide is prepared by adding 400 parts by weight of an aqueous solution containing about 35% by weight of hydrogen peroxide to 500 parts by weight of bis(beta-hydroxyethyl)sulfide at 50–80° C.

No references cited.